US012690067B2

(12) United States Patent
Ouchi

(10) Patent No.: US 12,690,067 B2
(45) Date of Patent: Jul. 21, 2026

(54) COMMUNICATION APPARATUS, CONTROL METHOD FOR COMMUNICATION APPARATUS, AND COMPUTER-READABLE STORAGE MEDIUM

(71) Applicant: CANON KABUSHIKI KAISHA, Tokyo (JP)

(72) Inventor: Masatomo Ouchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 18/458,914

(22) Filed: Aug. 30, 2023

(65) Prior Publication Data
US 2023/0413332 A1      Dec. 21, 2023

Related U.S. Application Data

(63) Continuation of application No. PCT/JP2021/048320, filed on Dec. 24, 2021.

(30) Foreign Application Priority Data

Mar. 1, 2021      (JP) ................................. 2021-032034

(51) Int. Cl.
| H04W 74/08 | (2024.01) |
| H04W 52/02 | (2009.01) |
| H04W 74/0816 | (2024.01) |

(52) U.S. Cl.
CPC ... *H04W 74/0816* (2013.01); *H04W 52/0216* (2013.01); *H04W 74/0866* (2013.01)

(58) Field of Classification Search
None
See application file for complete search history.

(56) References Cited

U.S. PATENT DOCUMENTS

| 2018/0084584 A1* | 3/2018 | Umehara | .......... H04W 74/0816 |
| 2021/0360646 A1* | 11/2021 | Chu | ..................... H04W 72/569 |
| 2023/0262768 A1* | 8/2023 | Ko | ..................... H04W 52/0216 |

(Continued)

FOREIGN PATENT DOCUMENTS

JP          2018050133 A      3/2018

OTHER PUBLICATIONS

Hu, Chunyu (Facebook Inc.), et al.; "Protected TWT Enhancement for Latency Sensitive Traffic"; Jul. 29, 2020; IEEE 802.11-20/1046r14; IEEE; Internet URL:https:mentor.ieee.org/802.11/dcn/20/11-20-1046-14-00be-prioritized-edca-channel-access-slot-management. pptx Feb. 25, 2021; pp. 1-22.

(Continued)

*Primary Examiner* — Benjamin Lamont
(74) *Attorney, Agent, or Firm* — Canon U.S.A., Inc. IP Division

(57)          ABSTRACT

A communication apparatus complying with an IEEE 802.11 series standard receives a frame for requesting a TWT (Target Wake Time) operation from a first other communication apparatus among a plurality of other communication apparatuses connected to the communication apparatus, and makes a predetermined notification so as to limit a time length of a transmission frame by a second other communication apparatus different from the first other communication apparatus among the plurality of other communication apparatuses, in a case where it is determined that the frame is a frame for periodic Low Latency communication.

7 Claims, 9 Drawing Sheets

(56)                    References Cited

U.S. PATENT DOCUMENTS

| | | | |
|---|---|---|---|
| 2023/0354426 A1* | 11/2023 | Lu ........................ | H04W 74/04 |
| 2024/0032089 A1* | 1/2024 | Chitrakar .............. | H04W 48/02 |
| 2024/0098712 A1* | 3/2024 | Chitrakar .............. | H04L 5/0035 |

OTHER PUBLICATIONS

Nezou, Patrice (Canon), et al.; "Low Latency Triggered TWT"; Feb. 19, 2021; IEEE 802.11-20/1843r3; IEEE; Internet URL:https:mentor.i eee.org/802.11/dcn/20/11-20-1843-03-00be-low-latency-triggered-twt. pptx Feb. 20, 2021; pp. 1-15.
Yang, Boyce Bo (Huawei), et al.; "Discussion on low latency traffic"; Nov. 2, 2020; IEEE 802.11-20-1852r2; IEEE; Internet URL:https://mentor.ieee.org/802.11/dcn/20/11-20-1852-02-00be-discussion-on-low-latency-traffic.pptx, Feb. 24, 2021; pp. 1-14.

\* cited by examiner

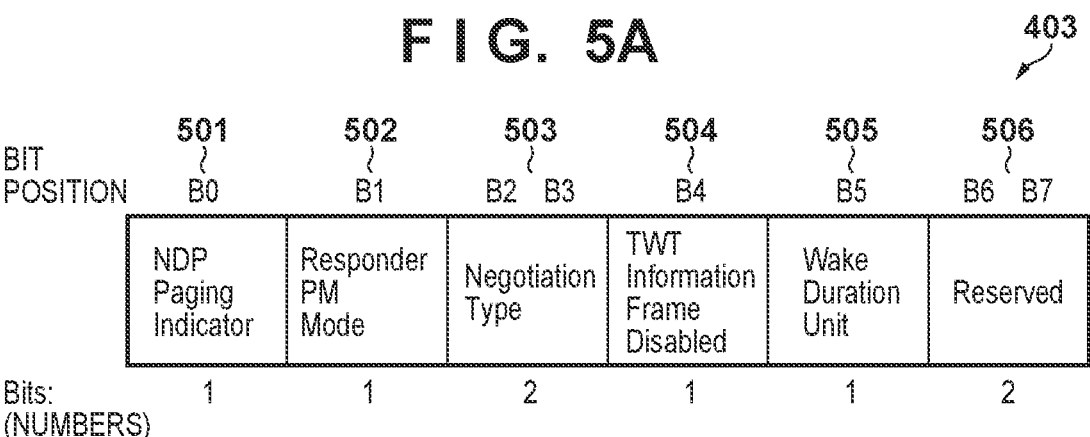

| BIT POSITION | 501<br>B0 | 502<br>B1 | 503<br>B2  B3 | 504<br>B4 | 505<br>B5 | 506<br>B6  B7 |
|---|---|---|---|---|---|---|
| | NDP Paging Indicator | Responder PM Mode | Negotiation Type | TWT Information Frame Disabled | Wake Duration Unit | Reserved |
| Bits: (NUMBERS) | 1 | 1 | 2 | 1 | 1 | 2 |

FIG. 5B

| Negotiation Type subfield | Target Wake Time field *(501)* | TWT Wake Interval Mantissa and TWT Wake Interval Exponent fields *(502)* | Description |
|---|---|---|---|
| 0 | A future Individual TWT SP start time | Interval between Individual TWT SPs | Individual TWT negotiation between TWT requesting STA and TWT responding STA or individual TWT announcement by TWT responder. |
| 1 | Next Wake TBTT time | Interval between Wake TBTTs | Wake TBTT and wake interval negotiation between TWT scheduled STA and TWT scheduling AP. |
| 2 | A future Broadcast TWT SP start time | Interval between Broadcast TWT SPs | Provide broadcast TWT schedules to TWT scheduled STAs by including the TWT element in broadcast Manegement frames sent by TWT scheduling AP. |
| 3 | A future Broadcast TWT SP start time | Interval between Broadcast TWT SPs | Manage memberships in broadcast TWT schedules by including the TWT element in individually addressed Management frames sent by either a TWT scheduled STA or a TWT scheduling AP. |

F I G. 6A
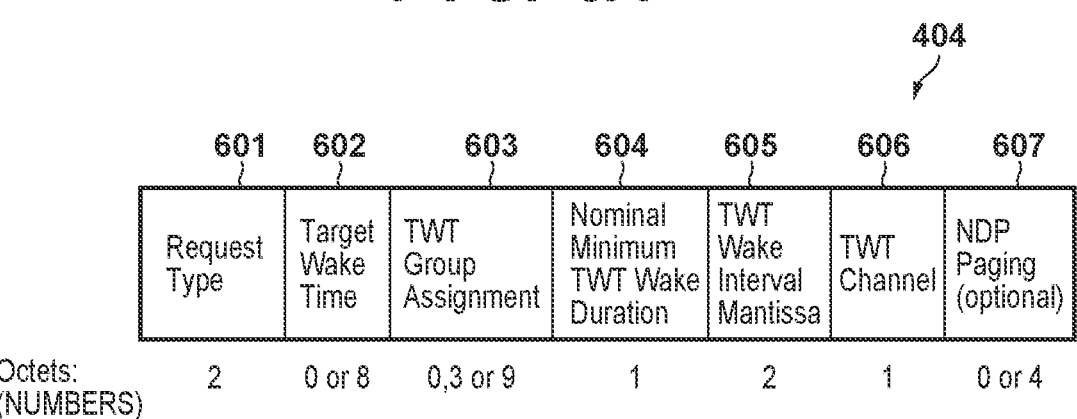
F I G. 6B
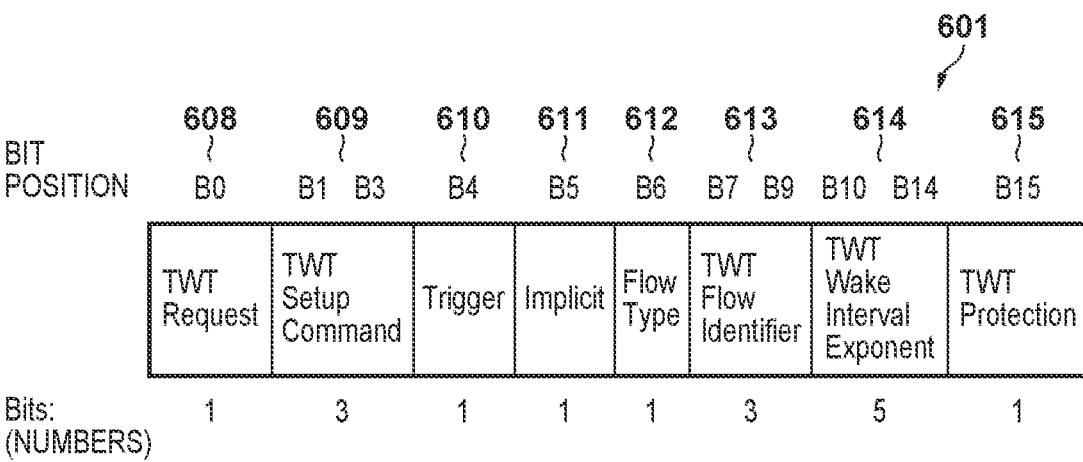

F I G. 7A
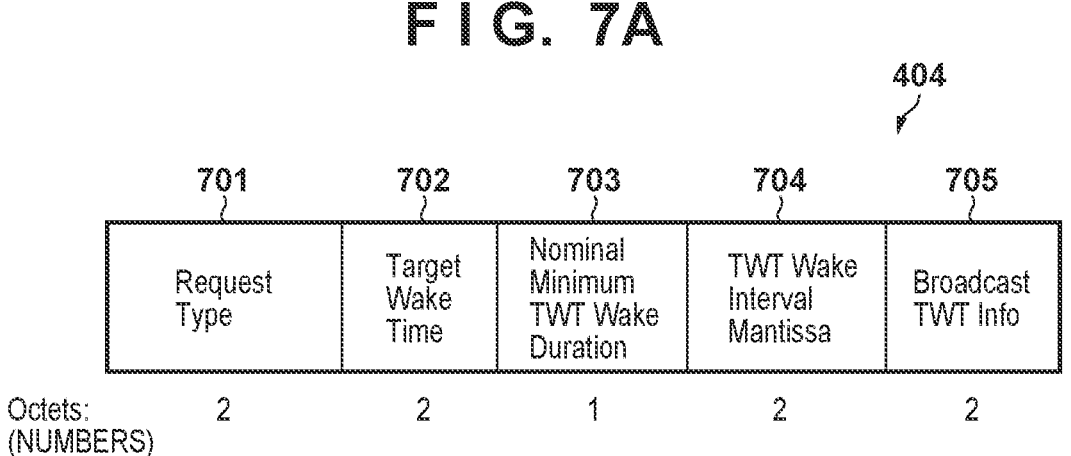
| Octets: (NUMBERS) | 701 Request Type 2 | 702 Target Wake Time 2 | 703 Nominal Minimum TWT Wake Duration 1 | 704 TWT Wake Interval Mantissa 2 | 705 Broadcast TWT Info 2 |
|---|---|---|---|---|---|
F I G. 7B
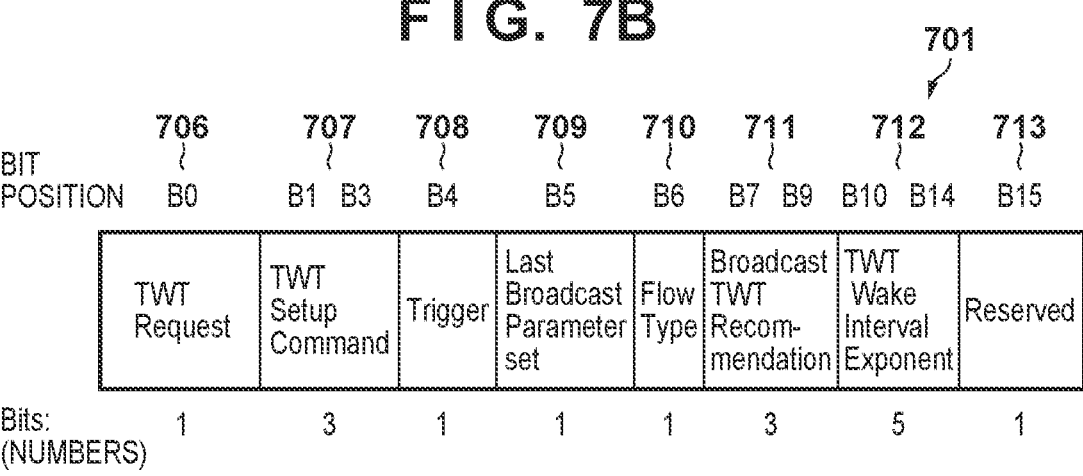
F I G. 7C
| BIT POSITION | 714 B0  B2 | 715 B3  B7 | 716 B8  B15 |
|---|---|---|---|
| | Reserved | Broadcast TWT ID | Broadcast TWT Persistence |
| Bits: (NUMBERS) | 3 | 5 | 8 |

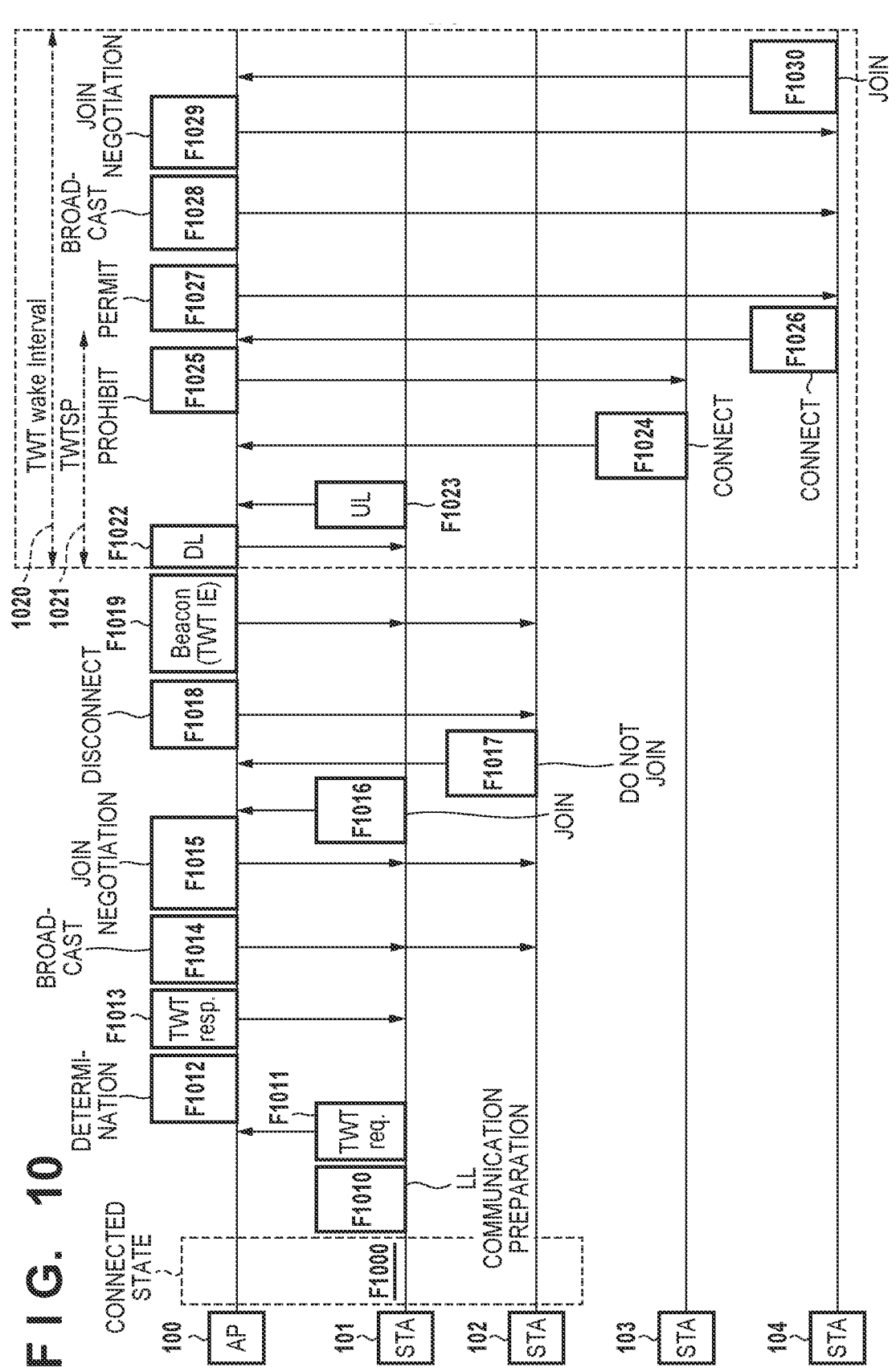
F I G. 10

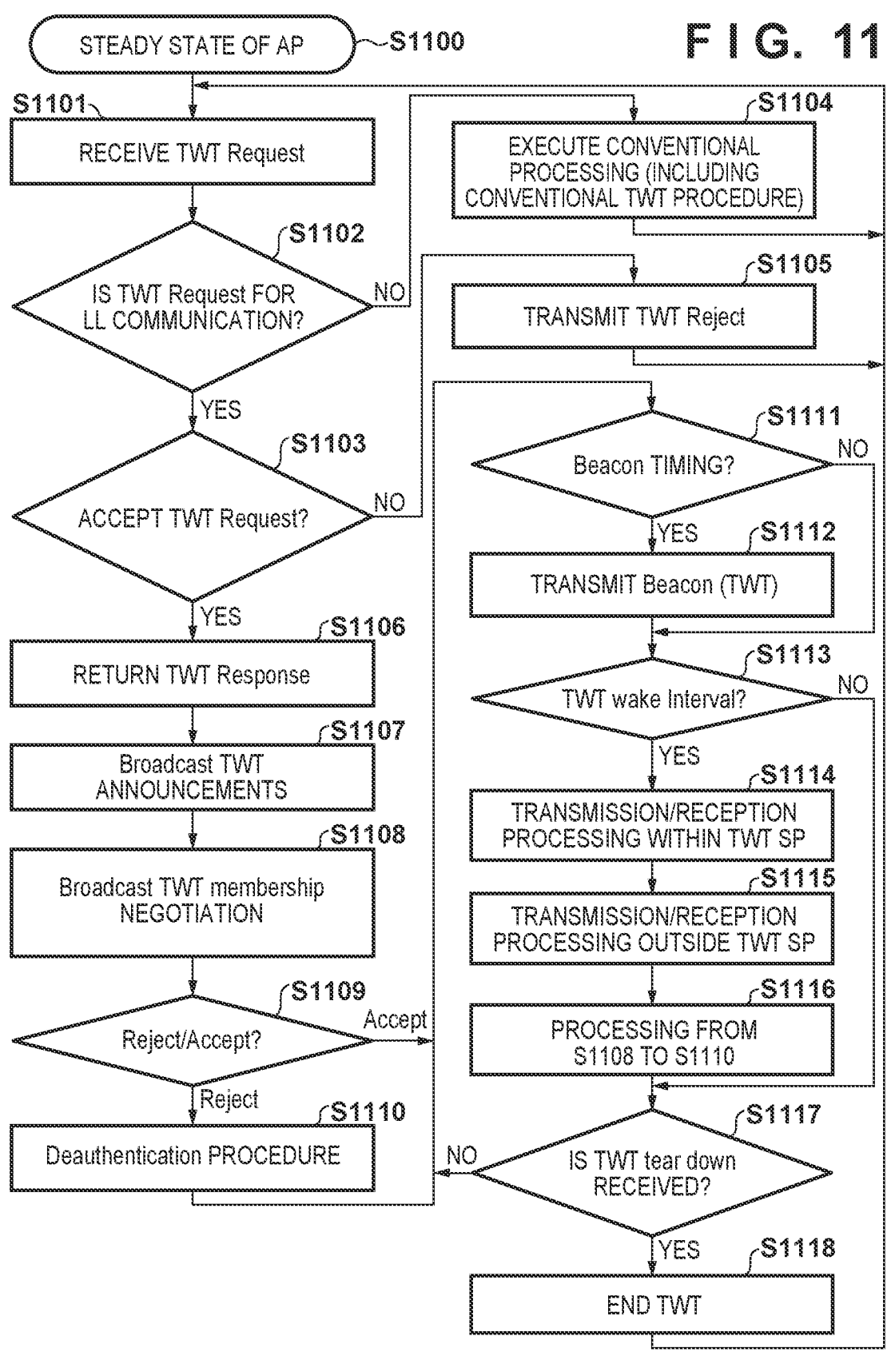
F I G. 11

COMMUNICATION APPARATUS, CONTROL METHOD FOR COMMUNICATION APPARATUS, AND COMPUTER-READABLE STORAGE MEDIUM

CROSS-REFERENCE TO RELATED APPLICATIONS

This application is a Continuation of International Patent Application No. PCT/JP2021/048320, filed Dec. 24, 2021, which claims the benefit of Japanese Patent Application No. 2021-032034 filed Mar. 1, 2021, both of which are hereby incorporated by reference herein in their entireties.

BACKGROUND OF THE INVENTION

Field of the Invention

The present invention relates to a wireless communication technique.

Background Art

As communication standards concerning a wireless LAN (Local Area Network), IEEE 802.11 series standards are known. The IEEE 802.11ax standard implements improvement of a communication speed under a congested situation using OFDMA (Orthogonal Frequency Division Multiple Access), in addition to high peak throughput (see Japanese Patent Laid-Open No. 2018-50133).

Presently, to further improve the throughput, the 802.11be TG (Task Group) is active as a standard replacing the IEEE 802.11ax standard, following an SG (Study Group) called IEEE 802.11 EHT (Extreme/Extremely High Throughput). As one of use cases aimed at by the TG, real-time Low Latency communication in a game or the like has been proposed.

CITATION LIST

Patent Literature

PTL 1: Japanese Patent Laid-Open No. 2018-50133

As a procedure of implementing Low Latency communication, the use of a periodic operation of TWT (Target Wake Time) has been examined. TWT is a power-saving mechanism usable in a (compatible) communication technique complying with the IEEE 802.11 series standard. If a TWT scheme is used, for example, an AP (Access Point) and one or more STAs (stations/terminal apparatuses) can negotiate a specific time or a series of times to access a medium.

However, if the TWT scheme is simply applied to Low Latency communication, a frame transmitted from an STA that performs no TWT operation may collide with a frame in Low Latency communication.

SUMMARY OF THE INVENTION

The present invention smoothly executes Low Latency communication.

A communication apparatus according to the present invention has the following arrangement. That is, there is provided a communication apparatus complying with an IEEE 802.11 series standard, comprising a reception unit configured to receive a frame for requesting a TWT (Target Wake Time) operation from a first other communication apparatus among a plurality of other communication apparatuses connected to the communication apparatus, a determination unit configured to determine whether the frame is a frame for periodic Low Latency communication, and a notification unit configured to make a predetermined notification so as to limit a time length of a transmission frame by a second other communication apparatus different from the first other communication apparatus among the plurality of other communication apparatuses, in a case where it is determined that the frame is the frame for the Low Latency communication.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a view showing a system configuration according to an embodiment.

FIG. 5A is a view showing an example of the structure of a Control field in the TWT element.

FIG. 5B is a table showing the meaning of a Negotiation Type subfield in the Control field.

FIG. 6A is a view showing an example of the structure of an Individual TWT Parameter set.

FIG. 6B is a view showing an example of the bit structure of a Request Type field in the Individual TWT Parameter set.

FIG. 7A is a view showing an example of the structure of a Broadcast TWT Parameter set.

FIG. 7B is a view showing an example of the bit structure of a Request Type field in the Broadcast TWT Parameter set.

FIG. 7C is a view showing an example of the bit structure of a Broadcast TWT Info field in the Broadcast TWT Parameter set.

FIG. 10 is a sequence chart showing a communication sequence according to Example 2.

FIG. 11 is a flowchart illustrating processing executed by an AP according to Example 2.

DESCRIPTION OF THE EMBODIMENTS

Figure 2:
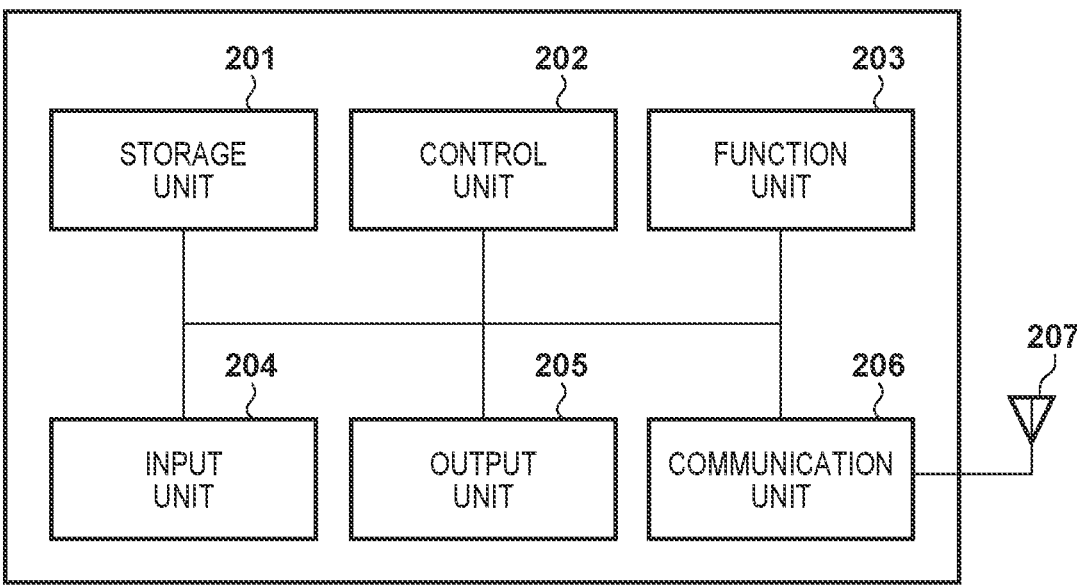
FIG. 2 is a block diagram showing an example of the hardware arrangement of a communication apparatus (AP or STA).

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment (System Configuration)

Figure 1:
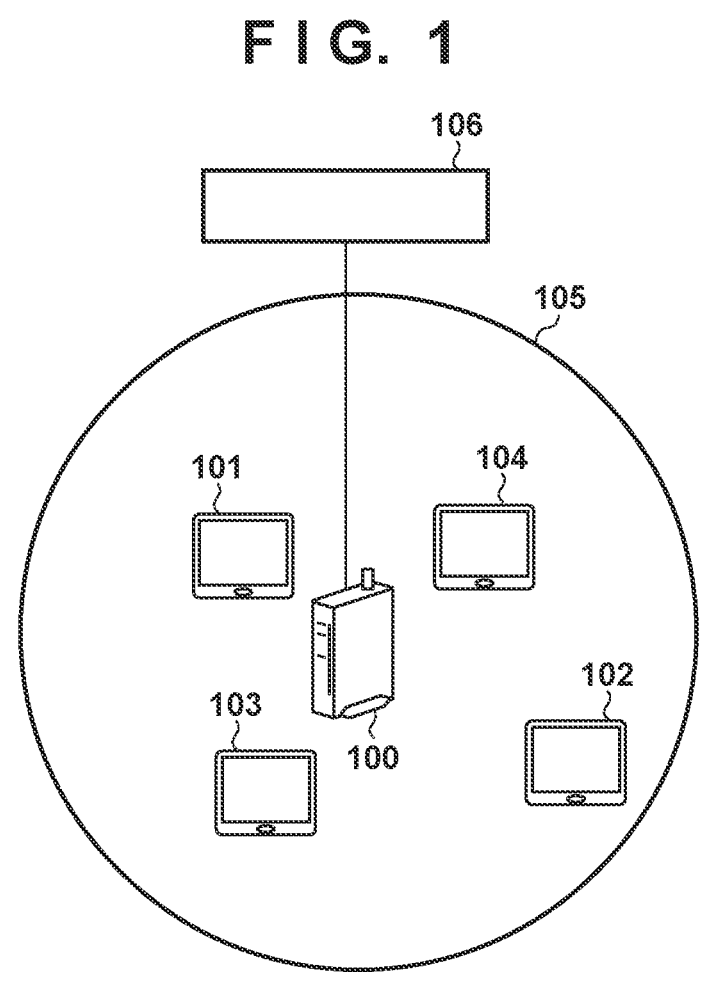

FIG. 1 shows a system configuration according to this embodiment. Note that terms used in this specification comply with 802.11ax Draft 6.0 released in November 2019. An AP (Access Point) 100 is a communication apparatus that manages a network 105 of a BBS (Basic Service Set) of a wireless LAN (Local Area Network) complying with the IEEE 802.11 series standard. STAs (stations/terminal apparatuses) 101 to 104 are communication apparatuses that communicate with the AP 100.

Practical examples of the AP 100 are a wireless LAN router and a Personal Computer (PC) but are not limited to them. Alternatively, the AP 100 may be an information processing apparatus such as a radio chip that can execute wireless communication complying with the IEEE 802.11 series standard. Furthermore, practical examples of each of the STAs 101 to 104 are a camera, a tablet, a smartphone, a PC, a mobile phone, a video camera, and a headset but are not limited to them. Alternatively, each of the STAs 101 to 104 may be an information processing apparatus such as a radio chip that can execute wireless communication complying with the IEEE 802.11 series standard.

The AP 100 is connected to a network of another BSS (Basic Service Set) or an external network via a DS (Distribution System) 106. This connection function is wired communication using Ethernet® or a telephone line or wireless communication using LET (Long Term Evolution) or WiMAX (Worldwide Interoperability for Microwave Access). Furthermore, this connection function may be a wireless LAN complying with the IEEE 802.11 series standard. In this case, a use radio channel may be the same as or different from a radio channel used between the AP 100 and the STAs 101 to 104.

(Arrangement of Communication Apparatus)

FIG. 2 shows an example of the hardware arrangement of the communication apparatus (AP 100 and STAs 101 to 104) according to this embodiment. In this example, the hardware arrangement of the AP 100 will be described. The AP 100 includes, as an example of the hardware arrangement, a storage unit 201, a control unit 202, a function unit 203, an input unit 204, an output unit 205, a communication unit 206, and an antenna 207.

The storage unit 201 is formed by a memory such as a ROM (Read Only Memory) or a RAM (Random Access Memory), and stores programs configured to perform various kinds of operations to be described later and various kinds of information such as communication parameters for wireless communication. Note that instead of the memory such as the ROM or the RAM, the storage unit 201 may include a storage medium such as a flexible disk, a hard disk, an optical disk, a magnetooptical disk, a CD-ROM, a CD-R, a magnetic tape, a nonvolatile memory card, or a DVD. The storage unit 201 may include a plurality of memories.

The control unit 202 is formed by, for example, a processor such as a CPU (Central Processing Unit) and an MPU (Micro Processing Unit), an ASIC (Application Specific Integrated Circuit), a DSP (Digital Signal Processor), an FPGA (Field Programmable Gate Array), or the like. The control unit 202 controls the AP 100 by executing programs stored in the storage unit 201. Note that the control unit 202 may control the AP 100 by cooperation of the programs stored in the storage unit 201 and an OS (Operating System). Alternatively, the control unit 202 may be formed by a plurality of processors such as a multi-core processor, and may control the AP 100.

The control unit 202 controls the function unit 203 to execute predetermined processing such as an AP function, an STA function, image capturing, printing, or projection. Furthermore, the control unit 202 controls the function unit 203 to execute predetermined processing such as image capturing, printing, or projection. The function unit 203 is hardware used by the AP 100 to execute a predetermined function.

The input unit 204 accepts various kinds of operations from a user. The output unit 205 performs various kinds of outputs to the user via a monitor screen or a loudspeaker. In this example, the output by the output unit 205 may be display on the monitor screen, audio output by the loudspeaker, vibration output, or the like. Note that both the input unit 204 and the output unit 205 may be implemented by one module, like a touch panel. Each of the input unit 204 and the output unit 205 may be integrated with the STA 102 or separated from the STA 102.

The communication unit 206 controls wireless communication complying with the IEEE 802.11 series standard, or controls IP (Internet Protocol) communication. Furthermore, the communication unit 206 controls the antenna 207 to transmit/receive radio signals for wireless communication.

The antenna 207 is an antenna capable of performing communication in a frequency band such as the 2.4-GHz band, 5-GHz band, or 6-GHz band. The AP 100 includes one antenna in this embodiment but may include a plurality of antennas. Alternatively, the AP 100 may include different antennas for respective frequency bands. If the AP 100 includes a plurality of antennas, it may include the communication units 206 respectively corresponding to the antennas.

Figure 3:
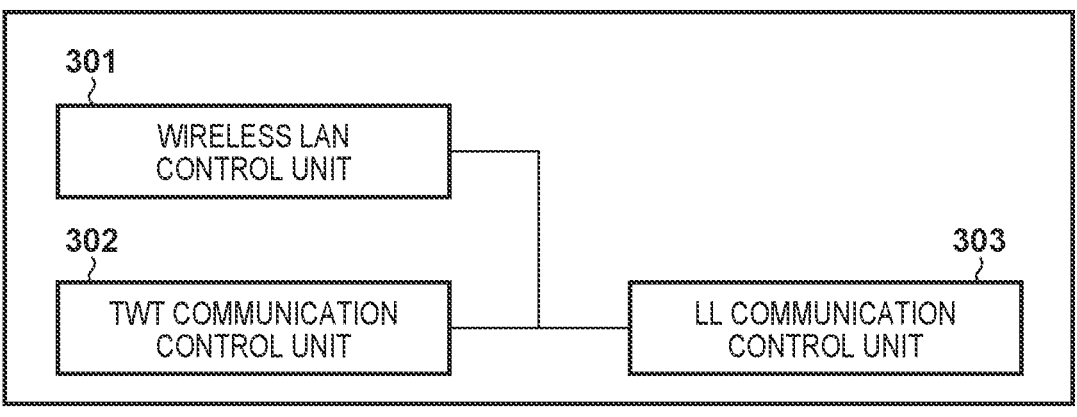
FIG. 3 is a block diagram showing an example of the functional (software) arrangement of the communication apparatus (AP).

FIG. 3 shows an example of the functional (software) arrangement of the communication apparatus (AP 100) according to this embodiment. As an example, this AP includes a wireless LAN control unit 301, a TWT communication control unit 302, and a Low Latency (LL) communication control unit 303.

The wireless LAN control unit 301 can be formed by including a program for executing control of transmitting/receiving radio signals to/from another wireless LAN apparatus. The wireless LAN control unit 301 transmits/receives a frame to/from the communication unit 206 via the antenna 207 in accordance with the IEEE 802.11 standard series, and executes communication control (connection control) of the wireless LAN. Note that the number of wireless LAN control units is not limited to one, and may be two, three, or more.

The TWT communication control unit 302 performs a TWT procedure introduced from the IEEE 802.11ah and IEEE 802.11ax standards. For example, the TWT communication control unit 302 can generate and analyze various kinds of frames/information in accordance with the TWT procedure, and transmit the generated frames and the like to the wireless LAN control unit 301.

The LL communication control unit 303 performs control concerning LL communication. For example, the LL communication control unit 303 can determine whether the frame received via the wireless LAN control unit 301 is a frame for LL communication. Furthermore, to reliably execute LL communication, the LL communication control unit 303 can set the value of a TXOP (Transmission Opportunity) limit representing the maximum transmittable time (the length of a transmission right) to the AP 100. Furthermore, the LL communication control unit 303 can generate and analyze various kinds of frames/information, and transmit the generated frames and the like via the wireless LAN control unit 301.

(Structure of TWT)

The structure of TWT (Target Wake Time) will be described. TWT is a power-saving mechanism usable in a communication technique complying with the IEEE 802.11 series standard. If the TWT scheme is used, for example, an AP (Access Point) and one or more STAs (stations/terminal apparatuses) can negotiate a specific time or a series of times taken for the STA to access a medium. If the TWT scheme is used, for example, a time during which each STA is in an awake state can be determined as a target time, and the schedule can be adjusted among the STAs. The STA (Non-AP STA) is generally set in a power-saving state but the AP can also be set in a power-saving state in accordance with the standard.

The TWT procedure for implementing the TWT function includes an Individual scheme and a Broadcast scheme. In the individual scheme, a setting request side of the TWT state is called a TWT requesting STA, and a response side is called a TWT responding STA. On the other hand, in the Broadcast scheme, a side of receiving a TWT state setting notification is called a TWT scheduled STA and a side of transmitting the notification is called a TWT scheduling AP.

The communication apparatus (AP and STAs (non-AP STAs)) mounted with the TWT function sets a management item "dot11TWTOptionImplemented" to "true". This management item is a MIB (Management Information Base) object managed by the IETF (Internet Engineering Task Force). This object can be confirmed from an external communication apparatus by a protocol called SNMP (Simple Network Management Protocol).

The communication apparatus mounted with the TWT function sets an HE Capabilities element representing the capability function of 802.11ax, as follows. The HE Capabilities element is included in a Management frame defined in the IEEE 802.11 series standard, such as a Beacon frame, connection procedure frames like Association request/response frames, or various kinds of Action frames.

In the Individual scheme, the STA operating as a TWT requesting STA sets "1" in a TWT Requester Support subfield (a bit position B1) in the HE Capabilities element.

The STA operating as a TWT responding STA sets "1" in a TWT Responder Support subfield (a bit position B2) in the HE Capabilities element.

The AP and the STA that can perform a Broadcast TWT operation set "1" in a Broadcast TWT Support subfield (a bit position B20) in the HE Capabilities element.

(Format of TWT Element)

Figure 4:
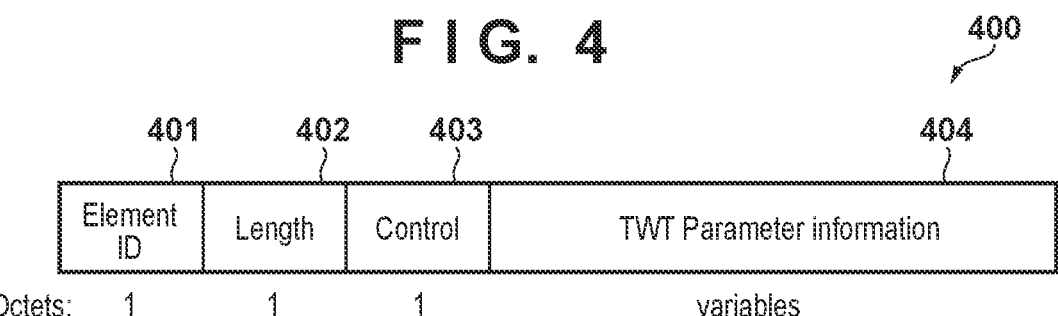
FIG. 4 is a view showing an example of the frame structure of a TWT element.

FIG. 4 shows an example of the non-limiting frame structure of a TWT element 400 as an information element (IE) that can be a constituent field of a Management frame or an extended frame thereof. The AP and STA mounted with the TWT function can perform negotiation such as a notification, request, and response using this information element. Note that in the following description, with respect to parts not associated with this embodiment, only names may be described and a detailed description according to a standard such as the IEEE 802.11ah or IEEE 802.11ax standard may be omitted.

An Element ID field 401 indicates the ID of the TWT element 400, and has a length of 1 octet. According to the 802.11ah standard, for the TWT element, the value of the Element ID field 401 is 216.

A Length field 402 indicates the length of the TWT element 400, and has a length of 1 octet.

A Control field 403 has a length of 1 octet. Details of the Control field 403 will be described later with reference to FIG. 5A.

A TWT Parameter Information field 404 has a variable length. Details of the TWT Parameter Information field 404 will be described later with reference to FIGS. 6A, 6B, and 7A to 7C.

FIG. 5A shows an example of the structure of the Control field 403.

An NDP Padding Indicator subfield 501 has a length of 1 bit.

A Responder PM Mode subfield 502 has a length of 1 bit.

A Negotiation Type subfield 503 has a length of 2 bits, and details thereof will be described later with reference to FIG. 5B.

A TWT Information Frame Disabled subfield 504 has a length of 1 bit. If this bit is 1, this indicates that reception of a TWT Information frame is disabled.

A Wake Duration Unit subfield 505 has a length of 1 bit. This represents the time unit of a Nominal Minimum TWT Wake Duration field 604 or 703 shown in FIG. 6A or 7A. If this bit is "0", this represents a unit of 256 μs (microseconds), and if this bit is "1", this represents a TU (Time Unit). In this example, the TU is defined in the IEEE 802.11 standard, and is 1024 μs A Reserved subfield 506 has a length of 2 bits.

FIG. 5B is a table showing the meaning of the Negotiation Type subfield 503. More specifically, FIG. 5B shows examples of interpretation of a Target Wake Time field 602 or 702, a TWT Wake Interval Mantissa field 605 or 704, and a TWT Wake Interval Exponent field 614 or 712 in FIGS. 6A and 6B or 7A and 7B, corresponding to the value of the Negotiation Type subfield 503. A column 501 indicates interpretation of the Target Wake Time field 602 or 702, and a column 502 indicates interpretation of the TWT Wake Interval Mantissa field 605 or 704 and the TWT Wake Interval Exponent field 614 or 712. If the Target Wake Time field 602 or 702 and the TWT Wake Interval Mantissa field 605 or 704 are not 0 (zero), this represents periodic TWT. Periodic TWT is a mechanism in which the duration of a TWT wake Interval is started regularly or periodically (has periodicity).

FIG. 6A shows an example of the non-limiting structure of the TWT Parameter Information field 404 (Individual TWT Parameter set) in the case of TWT of the Individual scheme.

A Request Type field 601 has a length of 2 octets. Details of the Request Type field 601 will be described later with reference to FIG. 6B.

The Target Wake Time field 602 has a length of 8 or 0 octets. This is represented by a TSF (Timing Synchronization Function) of the IEEE 802.11 series standard.

A TWT Group Assignment field 603 has a length of 9, 3, or 0 octets.

A Nominal Minimum TWT Wake Duration field 604 has a length of 1 octet. This is used to represent the time in combination with the Wake Duration Unit subfield 505 indicating the unit and the TWT Wake Interval Mantissa field 605.

The TWT Wake Interval Mantissa field 605 has a length of 2 octets.

A TWT Channel field 606 has a length of 1 octet.

An NDP Paging field 607 is optional, and has a length of 0 or 4 octets.

FIG. 6B shows an example of the bit structure of the 2 octets of the Request Type field 601 shown in FIG. 6A.

When the transmitter of the TWT element 400 is a "TWT requesting STA" or "TWT scheduled STA", "1" is set in a TWT Request field 608.

A TWT Setup Command field 609 is represented by 3 bits, and a 3-bit value indicates the type of the TWT Setup Command field 609. For example, if this value is "2", the type of the TWT Setup Command field 609 is Demand TWT, and this indicates to request to specify (designate) a TWT parameter and join TWT. If this value is "4", the type of the TWT Setup Command field 609 is Accept TWT, and this indicates to accept the TWT parameter designated from the STA. A description of other types will be omitted.

A Trigger field 610 indicates that a Trigger frame or a frame including TRS (Triggered Response Scheduling) is transmitted within the duration of a TWT SP (Service Period).

An Implicit field 611 indicates information implicitly representing that the start time of the next TWT SP is the time after the TWT Wake Interval. In the 802.11ax standard, if this filed is "1" and the NDP Paging field 607 is set with "0", a condition concerning the possibility of negotiation of Individual TWT is set.

A Flow Type field 612 is associated with an operation in a PS (Power Saving) mode. This is not related to a characteristic operation of the present invention, and a detailed description thereof will be omitted.

A TWT Flow Identifier field 613 is the same as the Flow Type field 612.

The TWT Wake Interval Exponent field 614 is used to indicate the time length of the TWT wake Interval as the period of Low Latency communication. A value obtained by "TWT Wake Interval Mantissa field 605"×"power (TWT Wake Interval Exponent field 614) of 2" is a length in microseconds.

A TWT Protection field 615 is set when the TWT requesting STA requests protection by a NAV (Network Allocation Vector).

FIG. 7A shows an example of the non-limiting structure of the TWT Parameter Information field 404 (Broadcast TWT Parameter set) in the case of the Broadcast scheme.

A Request Type field 701 has a length of 2 octets. Details of the Request Type field 701 will be described later with reference to FIG. 7B.

The Target Wake Time field 702 has a length of 2 octets.

A Nominal Minimum TWT Wake Duration field 703 has a length of 1 octet.

The TWT Wake Interval Mantissa field 704 has a length of 2 octets.

A Broadcast TWT Info field 705 has a length of 2 octets. Details of the Broadcast TWT Info field 705 will be described later with reference to FIG. 7C.

FIG. 7B shows an example of the bit structure of the 2 octets of the Request Type field 701 shown in FIG. 7A.

A TWT Request field 706 is the same as the TWT Request field 608.

A TWT Setup Command field 707 is the same as the TWT Setup Command field 609.

A Trigger field 708 is the same as the Trigger field 610.

A Last Broadcast Parameter Set field 709 is set with "0" if the Parameter set follows.

A Flow Type field 710 is the same as the Flow Type field 612.

A Broadcast TWT Recommendation field 711 is represented by 3 bits, and a 3-bit value indicates a constraint on a frame when the TWT element 400 is transmitted (broadcast). For example, if this value is "1", this indicates that the following listed frames are transmission frames recommended within the TWT SP. The frames include a PS-Poll frame, a QoS Null frame, a frame for feeding back a QoS Control frame and an HE TB feedback NDP, a BQR (Bandwidth Query Report) frame, a BSR (Buffer Status Report) frame, part of a sounding feedback exchange, and a Management frame such as an Action frame or Action No Ack frame, a Control response frame, and a Trigger frame for random access. If this value is "2", this indicates that a (Re)Association Request frame is a transmission frame recommended within the TWT SP in addition to the frames listed above in the case of "1".

The TWT Wake Interval Exponent field 712 is the same as the TWT Wake Interval Exponent field 614.

The Reserved field 713 is a reserved bit field.

FIG. 7C shows the bit structure of the 2 octets of the Broadcast TWT Info field 705 shown in FIG. 7A.

A Reserved field 714 is a reserved bit field.

A Broadcast TWT ID field 715 is used to specify Broadcast TWT in combination with a MAC address.

A Broadcast TWT Persistence field 716 indicates the number of TBTTs (Target Beacon Transmission Times) during the duration of the TWT SP corresponding to the TWT Parameter Information field 404 (Broadcast TWT Parameter set).

Example 1

Figure 8:
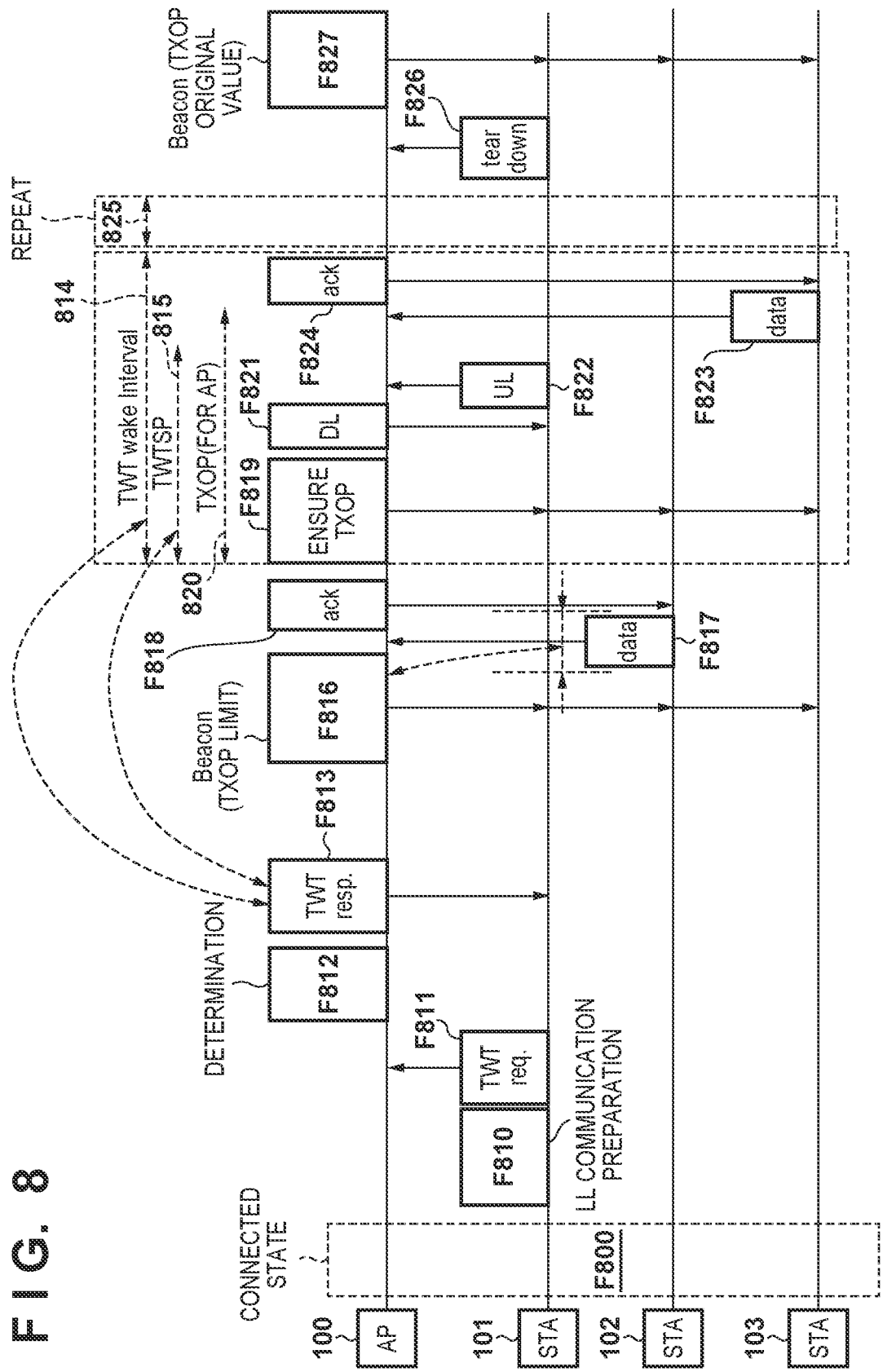
FIG. 8 is a sequence chart showing a communication sequence according to Example 1.

Subsequently, an example of this embodiment will be described. FIG. 8 shows a communication sequence between an AP 100 and STAs 101 to 103 according to Example 1. The AP 100 and the STAs 101 to 103 are in a connected state in a network 105 shown in FIG. 1 (F800). In this state, the STA 101 starts preparation to start LL (Low Latency) communication. In this example, the STA 101 decides, as attributes of LL communication, (1) the start time of the LL communication, (2) the permissible delay time in the LL communication, and (3) the minimum communication data amount in the permissible delay time (in a unit of the permissible delay time).

Subsequently, the STA 101 starts a TWT setup procedure. First, the STA 101 decides the field values in a TWT Parameter Information field 404 (Individual TWT Parameter set) of a TWT element 400 in accordance with the decided attributes (1) to (3) of the LL communication.

(1) The start time of the LL communication corresponds to "A future individual TWT SP start time" in a column 501 in a case where a Negotiation Type subfield 503 shown in FIG. 5B is "0". Therefore, the start time of the LL communication is reflected on a Target Wake Time 602 by setting "0" in the Negotiation Type subfield 503.

(2) The permissible delay time in the LL communication corresponds to "Interval between individual TWT SPs" in a column 502 in a case where the Negotiation Type subfield 503 shown in FIG. 5B is "0". Therefore, by setting "0" in the Negotiation Type subfield 503, a TWT Wake Interval Mantissa field 605 and a TWT Wake Interval Exponent field 614 are set to satisfy the permissible delay time.

(3) The minimum communication data amount is reflected on a Nominal Minimum TWT Wake Duration field 604.

Next, a TWT Request frame including the TWT element 400 set with the above-described values is transmitted to the AP 100 (F811). The value of a TWT Setup Command field 609 at this time is "2" meaning designation of a specific parameter. At this time, the STA 101 sets "0" in a Power Management field of a Frame Control field (not shown) of a MAC frame of a TWT setup procedure. This is done to indicate difference from power saving as the conventional purpose of TWT.

Upon receiving the TWT request frame, the AP 100 checks the Power Management field to recognize that the received TWT Request frame is for LL communication. Furthermore, the AP 100 determines whether to accept the request by the TWT Request frame (F812). The determination criterion depends on the setting of the user of the AP 100 or the attribute of the STA 101. In this example, the attribute is, for example, the service type of the STA 101 (terminal) such as a game apparatus, a real-time video apparatus, robotics, or an industrial product for automation. Assume that information of the service type is separately obtained by the AP 100 by a Service Discovery procedure in a standard such as the Wi-Fi® or UPnP® standard.

If the AP 100 accepts the request of the STA 101, it returns a TWT Response frame as a response (F813). If the request of the STA 101 is accepted intact, the field values in the TWT Parameter Information field 404 (Individual TWT Parameter set) are equal to the field values in the TWT Request frame in F811. This decides a periodic TWT wake Interval 814, the duration of a TWT SP 815, and the start time in FIG. 8 between the AP 100 and the STA 101.

Next, the AP 100 designates a value corresponding to the TWT wake Interval 814 as the TXOP (Transmission Opportunity) limit (changes the TXOP limit to the value) so as to limit the time length (the length of the transmission right) of the transmission frame to the STA other than the STA 101. This value is smaller than the TWT wake Interval 814. The AP 100 transmits, to the STA terminal of the BSS managed by itself, an EDCA Parameter set of a Beacon frame including the value of the TXOP limit (F816).

The TXOP limit is the maximum value (maximum transmittable time) of the period during which the STA that has started medium access can perform transmission by a series of communications. The default value of this value is defined for each access category of communication data. For example, if the communication data is of a video category, 4.096 ms (milliseconds) is defined, and if the communication data is of a voice category, 2.080 ms is defined. If the AP does not specifically designate the value, the STA can transmit communication of the video category for up to 4.096 ms. If this time is close to the period of the LL communication, the delay of the LL communication exceeds the permissible range.

In F817, the STA 102 sends a data frame. The time length of the data frame is limited by the above-described value of the TXOP limit. Upon receiving the data frame from the STA 102, the AP 100 returns an Ack frame in F818. Note that if the data frame is an aggregation frame, a Block Ack decided by the ADDBA (Add Block Ack) procedure is used.

In F819, the AP 100 ensures (sets) the TXOP. This is implemented by the RTS/CTS procedure, the MU-RTS/CTS procedure introduced from the 802.11ax standard, or the TF (Trigger Frame) procedure. The value (time length) of an ensured TXOP 820 is the value of the TXOP limit for an AP independent of the TXOP limit designated in F816. Furthermore, the value of the TXOP 820 is a value equal to or larger than the duration of the TWT SP 815.

In F821, the AP 100 transmits DL (Downlink) data to the STA 101. Subsequently, in F822, the STA 101 transmits UL (Uplink) data including an Ack. On the other hand, in F823, the STA 103 transmits data. At this time, the data length of the data is limited by the above-described TXOP limit (F816), and thus the probability of colliding with a TWT SP (not shown) within a next TWT wake Interval 825 is low. Upon receiving the data from the STA 103, the AP 100 returns an Ack frame in F824.

When the LL communication ends, the STA 101 transmits a TWT tear down frame to the AP 100 (F826). Upon receiving the TWT tear down frame, the AP 100 returns, to the previous value, the value of the TXOP limit designated (changed) in F816, and transmits a Beacon frame including the value (F827).

Figure 9:
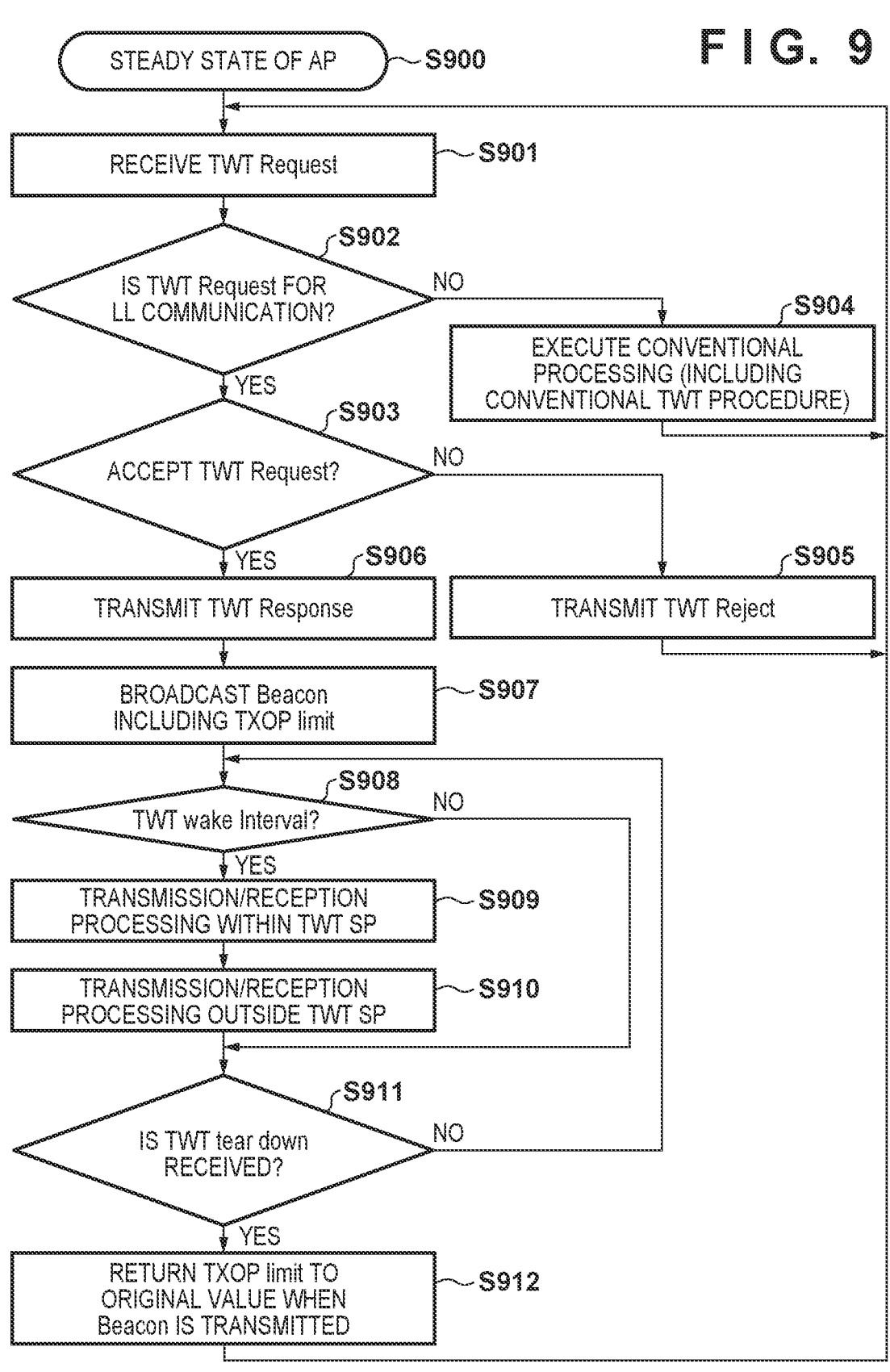
FIG. 9 is a flowchart illustrating processing executed by an AP according to Example 1.

FIG. 9 is a flowchart of processing executed by the AP 100 according to this example, and will be described with reference to the sequence shown in FIG. 8. In step S900, the AP 100 is in a steady state, and is connected to the STAs 101 to 103. In step S901, a wireless LAN control unit 301 of the AP 100 receives a TWT Request frame (F811). In step S902, an LL communication control unit 303 of the AP 100 determines whether the received TWT Request frame is for LL communication. If the TWT Request frame is for LL communication (YES in step S902), the process advances to step S903; otherwise (NO in step S902), the process advances to step S904. In step S904, a TWT communication control unit 302 of the AP 100 executes the conventional TWT procedure for a power-saving operation, and then, the AP 100 returns to a steady state S900. The conventional TWT procedure for a power-saving operation is not a characteristic portion of this embodiment and a description thereof will be omitted.

In step S903, the TWT communication control unit 302 of the AP 100 determines whether to accept the request by the TWT Request frame (F812). If the request is accepted (YES in step S903), the process advances to step S906; otherwise (NO in step S903), the process advances to step S905. In step S905, the TWT communication control unit 302 of the AP 100 transmits, to the STA 101, a TWT Reject frame indicating that the request is rejected.

In step S906, the TWT communication control unit 302 of the AP 100 transmits a TWT Response frame to the STA (F813). At this time, if the request of the STA 101 is accepted intact, the field values associated with the LL communication in the TWT Parameter Information field 404 (TWT Parameter set) are the same as the contents received in step S901. In step S907, the LL communication control unit 303 of the AP 100 sends a Beacon frame including the TXOP limit not larger than the TWT wake Interval (F816). Furthermore, the LL communication control unit 303 of the AP 100 sets the MIB of the TXOP limit of the AP 100 to a value not smaller than the TWT SP.

In step S908, the TWT communication control unit 302 of the AP 100 determines whether the timing of the TWT wake Interval has come. If the timing has come (YES in step S908), the process advances to step S909; otherwise (NO in step S908), the process advances to step S911. In step S909, the TWT communication control unit 302 of the AP 100 performs transmission/reception processing with the STA 101 within the TWT SP (F821 and F822). In step S910, the TWT communication control unit 302 of the AP 100 performs transmission/reception processing with the respective STAs outside the TWT SP. The respective STAs may include the STA 101.

If the TWT communication control unit 302 of the AP 100 receives a TWT tear down frame in step S911 (YES in step S911, F826), the process advances to step S912, otherwise (NO in step S911), the process returns to step S908. In step S912, the LL communication control unit 303 of the AP 100 returns the value of the TXOP limit for the STA to the value in the steady state. After that, the LL communication control unit 303 of the AP 100 makes a notification of the returned value of the TXOP limit at a timing of transmitting a Beacon frame.

Example 2

Example 2 will be described next. Points different from Example 1 will mainly be described. FIG. 10 shows a communication sequence between an AP 100 and STAs 101 to 104 according to Example 2. The AP 100 and the STAs 101 and 102 are in a connected state in a network 105 shown in FIG. 1 (F1000). In this state, the STA 101 starts preparation to start LL communication. Processing in this preparation is the same as that described in Example 1. In F1011, the STA 101 transmits a TWT Request frame to the AP 100. The processing in F1011 is the same as in F811 of FIG. 8. In F1012, the AP 100 determines whether to accept the request by the TWT Request frame. The processing in F1012 is the same as in F812 of FIG. 8. If the AP 100 accepts the request of the STA 101, it returns a TWT Response frame as a response (F1013). The processing in F1013 is the same as in F813 of FIG. 8.

In F1014, the AP 100 makes a notification of a Broadcast TWT announcement. In F1015, the AP 100 performs a negotiation procedure of Broadcast membership exchanges. In F1014 and F1015, the AP 100 makes a notification of the period of the LL communication, and inquires about whether to join a Broadcast membership (a member of Broadcast TWT). This notification includes a TWT Parameter Information field 404 (Broadcast TWT Parameter set), in which values designate by the STA 101 are included in a Target Wake Time field 702, a Nominal Minimum TWT Wake Duration field 703, a TWT Wake Interval Mantissa field 704, and a TWT Wake Interval Exponent field 712. Accept TWT (that is, a value of "2") is designated in a TWT Setup Command field 707.

The STA 101 that joins the Broadcast membership (accepts the notification from the AP 100) responds to the AP 100 by TWT Accept indicating to join the Broadcast membership in F1016. On the other hand, the STA 102 that terminates joining the Broadcast membership (rejects the notification from the AP 100) responds to the AP 100 by TWT Reject indicating not to join the Broadcast membership in F1017. Alternatively, the STA 102 may transmit no response or may transmit a response indicating not to accept. In response to this, the AP 100 executes a Deauthentication procedure with the STA 102, thereby disconnecting the connection (F1018).

In F1019, the AP 100 transmits a Beacon frame including a TWT element 400 at a TBTT (Target Beacon Transmission Time) timing. In the processing so far, the durations of a periodic TWT wake Interval 1020 and a TWT SP 1021 are decided. If negotiation of the First TBTT has been performed in the processes in F1011 and F1013, the AP 100 may designate the TWT SP 1021 by the TWT element 400 in the Beacon frame transmitted in F1019.

In F1022, the AP 100 transmits DL (Downlink) data to the STA 101. The AP 100 can include TRS (Triggered Response Scheduling) in this data frame. Subsequently, in F1023, the STA 101 transmits UL (Uplink) data including an Ack.

Assume here that the STA 103 sends a connection request to the AP 100 (F1024). However, to prevent a situation in which a connection procedure will not end in the duration of the TWT SP 1021 to influence the LL communication, the AP 100 does not accept this connection request. In particular, depending on the security setting, processing, such as the 4-way handshake in the connection procedure, that takes time may be required. In F1025, the AP 100 notifies the STA 103 that the connection request is not permitted. Furthermore, after that, assume that the STA 104 sends a connection request to the AP (F1026). The AP 100 determines that a connection procedure will end in the duration of the TWT wake Interval 1020, and accepts the connection request. In F1027, the AP 100 notifies the STA 104 that the connection request is permitted.

In F1028, the AP 100 makes a notification of Broadcast TWT announcements. This notification is generally a notification to all the STAs (STAs 101 to 104) by a Beacon frame but may be made to the STA 104 that is newly set in the connected state. In F1029, the AP 100 performs a negotiation procedure of Broadcast membership exchanges. The AP 100 may also execute this procedure with all the STAs but may execute this procedure with the STA 104 that is newly set in the connected state.

In F1030, the STA 104 transmits, to the AP 100, TWT Accept indicating to join the Broadcast membership. If, at this time, the STA 104 transmits, to the AP 100, TWT Reject indicating not to join the Broadcast membership, the AP 100 executes a Deauthentication procedure with the STA 104.

After that, although not shown in FIG. 10, if the LL communication of the STA 101 ends, the STA 101 transmits a TWT tear down frame to the AP 100. In response to this, the AP 100 ends Broadcast TWT.

In Example 2, all the STAs in the BSS use the TWT schedule according to the communication attribute of the STA 101, thereby implementing the LL communication within the TWT SP (TWT SP 1021). The LL communication of the STA 101 can be implemented when the STA that has accepted the TWT parameter (each field value in the Parameter Information field 404) uses the standard "the STA should not perform transmission outside the TWT SP". That is, the STAs 102 to 104 as STAs other than the STA 101 refrain from starting transmission outside the TWT SP, and transmission/reception by the STAs is controlled by the AP 100 within the TWT SP.

FIG. 11 is a flowchart of processing executed by the AP 100 according to this example, and will be described with reference to the sequence shown in FIG. 10. Processes in steps S1100 and S1102 to S1106 are the same as those in steps S900 and S902 to S906 of FIG. 9 described in Example 1 and a description thereof will be omitted. Steps S1101 and S1106 are different from steps S901 and S906 of FIG. 9 in that steps S1101 and S1106 may include negotiation of the TBTT timing of a Beacon frame including the TWT element 400. If this negotiation is not performed, steps S1101 and S1106 are the same as steps S901 and S906 of FIG. 9.

In step S1107, a TWT communication control unit 302 of the AP 100 makes a notification of Broadcast TWT announcements (F1014). In step S1108, the AP 100 performs a procedure (negotiation) of Broadcast membership exchanges (F1015).

If the TWT communication control unit 302 of the AP 100 receives TWT Reject in step S1109, the process advances to step S1110. If TWT Accept is received, the process advances to step S1111. In step S1110, a wireless LAN control unit 301 of the AP 100 executes a Deauthentication procedure with the STA that has transmitted TWT Reject, and disconnects the connection (F1018). In step S1111, the wireless LAN control unit 301 of the AP 100 confirms whether a Beacon frame transmission timing has come. If the timing has come (YES in step S1111), the process advances to step S1112; otherwise (NO in step S1111), the process advances to step S1113.

In step S1112, the TWT communication control unit 302 of the AP 100 transmits a Beacon frame including the TWT element 400 (F1019). Next, the TWT communication control unit 302 of the AP 100 confirms whether the timing of the TWT wake Interval has come. If the timing has come (YES in step S1113), the process advances to step S1114; otherwise (NO in step S1113), the process advances to step S1117. The TWT communication control unit 302 of the AP 100 performs, in step S1114, transmission/reception processing within the TWT SP, and performs, in step S1115, transmission/reception processing outside the TWT SP.

In step S1116, if the AP 100 is connected to a new STA (terminal), it performs the processes in steps S1108 to S1110. In step S1117, the TWT communication control unit 302 of the AP 100 confirms whether a TWT tear down frame is received. If this frame is received (YES in step S1117), the process advances to step S1118; otherwise (NO in step S1117), the process returns to step S1111. In step S1118, the AP 100 ends Broadcast TWT.

Modification 1

In Example 2, a TWT may already be established between the AP 100 and the STA 102 during a period from F1000 to F1010 in FIG. 10. In this case, in step S1013, the AP 100 can use unsolicited TWT or recommended broadcast TWT switch instead of TWT Broadcast announcements.

Modification 2

In Example 2, in step S1118 of FIG. 11, the AP 100 may continue Broadcast TWT without ending it. The reason why the TWT operation is continued is to, for example, cope with a case where the STA 103 continues the TWT operation.

Modification 3

In Example 2, Individual TWT or Broadcast TWT may be operated as trigger-enabled TWT. This operation can be implemented by setting "1" in the Trigger field (Trigger field 610 or 708) of TWT Response or announcements transmitted from the AP 100. In this case, it is possible to control UL (Uplink) communication between the STAs 101 and 104 by a TF (Trigger Frame) within a TWT wake Interval (not shown) after the TWT wake Interval 1020 in FIG. 10.

Modification 4

The AP 100 may be able to grasp the communication data amount of the STA 101 by a BSR (Buffer Status Report) frame of the 802.11-2016 standard or 802.11ax Draft. In this case, the AP 100 may ensure TXOP even after the duration of the TWT SP ends, that is, the TWT SP 815 or TWT SP 1021 ends, and prompt the STA 101 to perform UL communication by a TF. Note that in the case of Broadcast TWT, a BSR notification may be recommended by setting "1" or "2" in a Broadcast TWT Recommendation field 711.

Modification 5

As a function forming the Broadcast TWT membership, it is possible not to associate (connect) an STA (terminal) that does not support TWT. This can be implemented by determining, based on an HE Capabilities element in an Association request frame, whether the STA supports TWT.

Modification 6

Since the above-described example aims at implementing LL communication, the power-saving operation as the conventional purpose of TWT has not been mentioned. If the AP 100 communicates with an STA that aims at power-saving communication, it can support a PS-Poll frame and a QoS Null frame from the STA during a data transmission/reception period.

As described above, according to the above-described embodiment, since Low Latency communication can smoothly be executed even in a situation where various apparatuses are mixed, without changing the already widespread TWT standard, the application purpose of a wireless LAN is extended to improve usability.

According to the present invention, it is possible to smoothly execute Low Latency communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus complying with an IEEE 802.11 series standard, comprising:
   one or more processors; and
   a memory storing instructions that, when executed by the one or more processors, cause the communication apparatus to:
   receive a frame for requesting a TWT (Target Wake Time) operation from a first other communication apparatus among a plurality of other communication apparatuses connected to the communication apparatus;
   determine whether the frame is a frame for periodic Low Latency communication; and
   perform a predetermined notification so as to limit a time length of a transmission frame by a second other communication apparatus different from the first other communication apparatus among the plurality of other communication apparatuses, in a case where it is determined that the frame is the frame for the Low Latency communication, wherein information corresponding to attributes of the Low Latency communication decided by the first other communication apparatus is set in the frame for the Low Latency communication, wherein the attributes of the Low Latency communication include a start time of the Low Latency communication, a permissible delay time in the Low Latency communication, and a minimum communication data amount in the Low Latency communication.

2. The communication apparatus according to claim 1, wherein the predetermined notification is performed by transmitting a Beacon frame that designates a value, which is not larger than a value of a TWT wake Interval decided with the first other communication apparatus based on the frame for requesting a TWT, as the value of a TXOP (Transmission Opportunity) limit representing a maximum transmittable time to the second other communication apparatus.

3. The communication apparatus according to claim 1, further setting a TXOP (Transmission Opportunity) limit with respect to the communication apparatus after the predetermined notification is performed, wherein a value, which is not smaller than a duration of a TWT SP (Service Period) decided with the first other communication apparatus based on the frame for requesting a TWT, is set as the value of the TXOP limit representing a maximum transmittable time to the communication apparatus.

4. The communication apparatus according to claim 1, wherein in a case where the frame is not determined to be a frame for power saving, the frame is determined to be the frame for the Low Latency communication.

5. The communication apparatus according to claim 4, wherein whether or not the frame is intended for power saving is determined based on a value of a Power Management field included in the frame.

6. A control method for a communication apparatus complying with an IEEE 802.11 series standard, comprising:

receiving a frame for requesting a TWT (Target Wake Time) operation from a first other communication apparatus among a plurality of other communication apparatuses connected to the communication apparatus;

determining whether the frame is a frame for periodic Low Latency communication; and making a predetermined notification so as to limit a time length of a transmission frame by a second other communication apparatus different from the first other communication apparatus among the plurality of other communication apparatuses, in a case where it is determined that the frame is the frame for the Low Latency communication, wherein information corresponding to attributes of the Low Latency communication decided by the first other communication apparatus is set in the frame for the Low Latency communication, wherein the attributes of the Low Latency communication include a start time of the Low Latency communication, a permissible delay time in the Low Latency communication, and a minimum communication data amount in the Low Latency communication.

7. A non-transitory computer-readable storage medium that stores a program for causing a computer included in a communication apparatus complying with an IEEE 802.11 series standard to:

receive a frame for requesting a TWT (Target Wake Time) operation from a first other communication apparatus among a plurality of other communication apparatuses connected to the communication apparatus;

determine whether the frame is a frame for periodic Low Latency communication; and make a predetermined notification so as to limit a time length of a transmission frame by a second other communication apparatus different from the first other communication apparatus among the plurality of other communication apparatuses, in a case where it is determined that the frame is the frame for the Low Latency communication, wherein information corresponding to attributes of the Low Latency communication decided by the first other communication apparatus is set in the frame for the Low Latency communication, wherein the attributes of the Low Latency communication include a start time of the Low Latency communication, a permissible delay time in the Low Latency communication, and a minimum communication data amount in the Low Latency communication.

* * * * *